(12) United States Patent
Lin

(10) Patent No.: US 9,631,598 B2
(45) Date of Patent: Apr. 25, 2017

(54) HIGH BUILDING POWER GENERATION DEVICE

(71) Applicant: Hsien-Ming Lin, Chupei (TW)

(72) Inventor: Hsien-Ming Lin, Chupei (TW)

( * ) Notice: Subject to any disclaimer, the term of this patent is extended or adjusted under 35 U.S.C. 154(b) by 28 days.

(21) Appl. No.: 14/730,219

(22) Filed: Jun. 3, 2015

(65) Prior Publication Data

US 2016/0115938 A1   Apr. 28, 2016

(30) Foreign Application Priority Data

Oct. 24, 2014   (TW) .............................. 103218878 U

(51) Int. Cl.
*F03D 9/00* (2016.01)
*F03B 13/00* (2006.01)

(52) U.S. Cl.
CPC ................ *F03B 13/00* (2013.01); *F03D 9/00* (2013.01); *F05B 2220/602* (2013.01); *F05B 2220/604* (2013.01); *F05B 2240/9112* (2013.01); *F05B 2260/42* (2013.01); *Y02B 10/50* (2013.01); *Y02E 60/17* (2013.01)

(58) Field of Classification Search
CPC ................ F03B 13/10; F05B 2220/602; F05B 2220/604; F05B 2240/9112; F05B 2260/42
USPC ............................................ 290/43, 54, 1 R
See application file for complete search history.

(56) References Cited

U.S. PATENT DOCUMENTS

| | | | | |
|---|---|---|---|---|
| 2,861,195 A | * | 11/1958 | Salzer | F03B 3/00 290/4 R |
| 4,246,753 A | * | 1/1981 | Redmond | F03B 13/00 290/43 |
| 4,352,025 A | * | 9/1982 | Troyen | F03B 13/00 290/54 |
| 6,861,766 B2 | * | 3/2005 | Rembert | F03D 9/13 290/43 |
| 2003/0024238 A1 | * | 2/2003 | Francis | F03B 7/00 60/398 |
| 2009/0058092 A1 | * | 3/2009 | Chen | F03B 17/005 290/54 |
| 2012/0187690 A1 | * | 7/2012 | Walton | F03B 7/00 290/54 |
| 2012/0187691 A1 | * | 7/2012 | Shaban | F03B 13/00 290/54 |

FOREIGN PATENT DOCUMENTS

FR   2789126 A1 *  8/2000  ............. F03B 13/00

* cited by examiner

*Primary Examiner* — Julio C Gonzalez
(74) *Attorney, Agent, or Firm* — Leong C. Lei

(57) ABSTRACT

A high building power generation device includes a plurality of water storage tanks and at least one power generation unit. The water storage tanks are arranged at specific floors of a high building so that a predetermined vertical distance is provided between adjacent ones of the water storage tanks. The water storage tanks are connected to each other with pipes. A control valve is mounted at a connection of each water storage tank with the pipes. The power generation unit is arranged at a bottom floor of the high building. The pipes connecting with the water storage tanks have a lower opening that is located above the power generation unit. The water storage tanks accumulate and store used water from multiple floors and the control valves are openable to release the used water to impact and drive the power generation unit to generate electrical power.

2 Claims, 5 Drawing Sheets

HIGH BUILDING POWER GENERATION DEVICE

TECHNICAL FIELD OF THE INVENTION

The present invention relates generally to a high building power generation device, and more particularly to a high building power generation device that stores used water in multiple floors and allows the used water so stored to impact a power generation unit to generate electrical power.

DESCRIPTION OF THE PRIOR ART

Due to the uninterrupted consumption of energy of the Earth, global warming is getting worse and severer and energies are getting depleted. All the countries around the world are devoted to projects of generating electrical power through natural ways. The solutions of generating electrical power in through natural ways that are currently adopted include hydraulic power, wind power, solar power, and nuclear power. Taking hydraulic power generation as an example, bulky water wheels must be built and installed. The cost is high and a proper site must be available for the installation, making it hard to get popularized. For wind power generation, a tall tower like frame must be built and large wind blades must be mounted on the top of the tower. The cost is also high and installation is only available for areas that are windy all year round. The wind power generation is not an option for areas where winds are weak.

For solar power or solar energy, the cost is also high and long term sun shining is a necessary condition. Thus, the installation expense is high and the performance is not totally under control. For nuclear power, although it is considered a type of clean energy, safety issue and pollution to the Earth are always of concerns and are long questioned by environmentalists and are still under debate.

The contemporary environment of residence is generally full of high buildings of tens of floors. Water used to wash and clean in such buildings is generally drained without being re-used. This is a quite a waste of natural resources. In view of this, the present invention aims to provide a high building power generation device that stores used water in multiple floors and allows the used water so stored to impact a power generation unit to generate electrical power.

SUMMARY OF THE INVENTION

The primary object of the preset invention is to provide a high building power generation device that stores used water in multiple floors and allows the used water so stored to impact a power generation unit to generate electrical power so as to achieve a purpose of re-use of used water and saving of energy.

The high building power generation device of the present invention comprises a plurality of water storage tanks and at least one power generation unit. The water storage tanks are arranged at specific floors of the high building in a manner of being spaced from each other so that a predetermined vertical distance is provided between adjacent ones of the water storage tanks. The water storage tanks are connected with each other through pipes. A control valve is mounted at a connection of each of the water storage tanks and the pipes. The power generation unit is arranged at a bottom floor of the high building. The pipes connecting with the water storage tanks have a lower opening that is located above the power generation unit. As such, used water from multiple floors and stored in each of the water storage tanks is allowed to release in such a way that the used water flows downward along the pipes to impact the power generation unit to drive the power generation unit to generate electrical power.

The high building power generation device of the present invention is structured in such a way that the power generation unit comprises a chassis. An accommodation chamber is formed on the chassis. The accommodation chamber comprises a top tank. The top tank has a water discharge opening. The accommodation chamber comprises a first rotary mechanism and a second rotary mechanism mounted therein. A slope water guide channel is arranged above the second rotary mechanism. The first rotary mechanism and the second rotary mechanism are respectively coupled to power generation elements, whereby the used water that flows down impacts the first rotary mechanism and the second rotary mechanism to cause the first rotary mechanism and the second rotary mechanism to rotate in predetermined direction and thus drive the power generation elements to generate electrical power.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
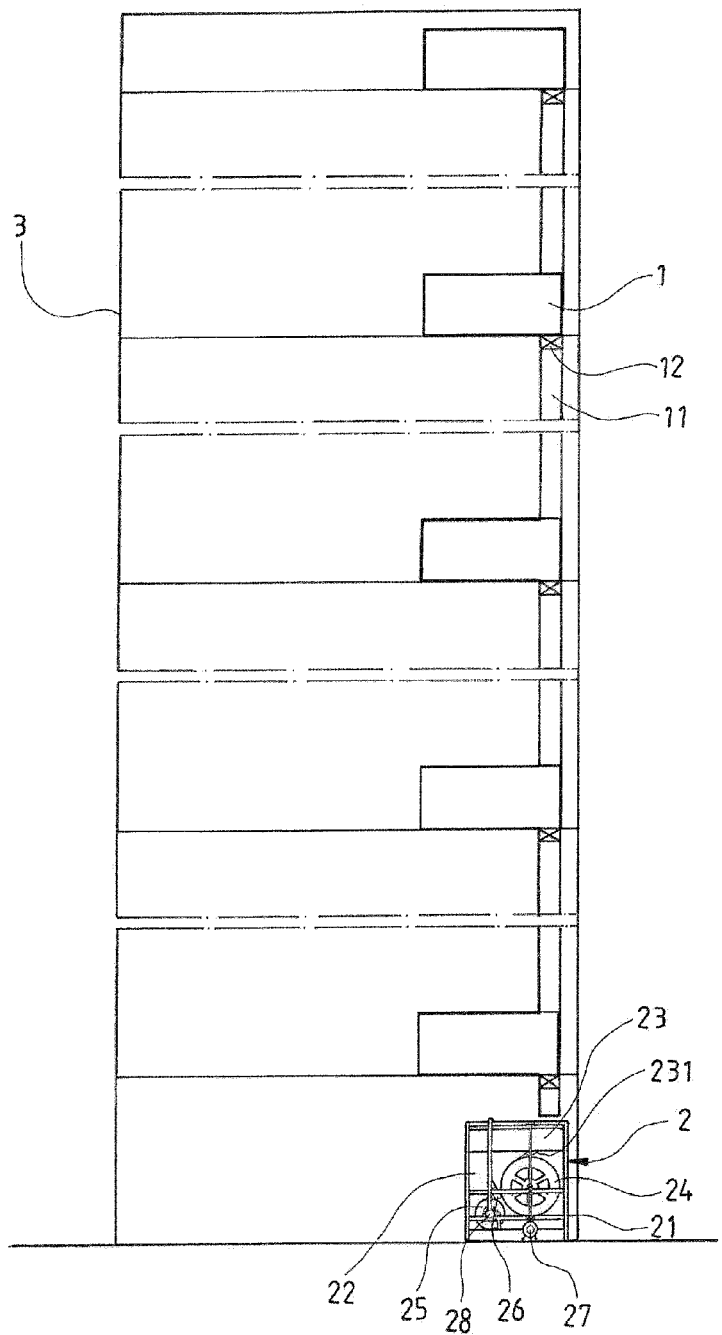
FIG. 1 is a schematic view showing the structure of the present invention.
Figure 2:
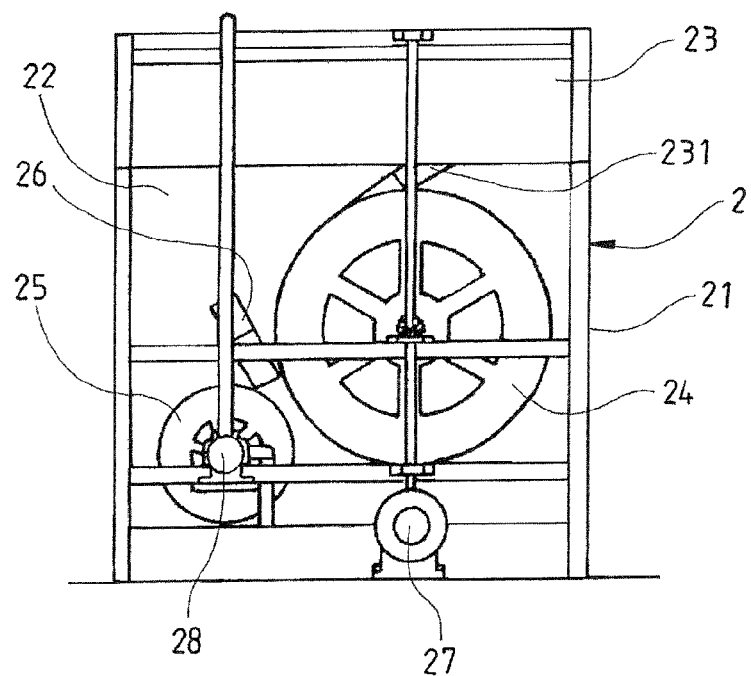
FIG. 2 is a schematic view showing the structure of a power generation unit according to the present invention.

Referring collectively to FIGS. 1 and 2, which are respectively a schematic view illustrating the present invention and a schematic view illustrating a power generation unit according to the present invention, as shown in the drawings, the present invention comprises a plurality of water storage tanks 1 and at least one power generation unit 2. The water storage tanks 1 are arranged at specific floors of a high building 3 so as to be spaced from each other by predetermined distances, whereby a predetermined vertical distance is defined between adjacent ones of the water storage tanks 1. The water storage tanks 1 are connected to each other by pipes 11 and a control valve 12 is mounted at a connection between each of the water storage tanks 1 and each of the pipes 11. In the instant embodiment, the water storage tanks 1 are arranged at floors of the high building 3 that are separate by a predetermined number of floors. For example, considering the entire high building 3 has 40 floors, the water storage tanks 1 could be installed at the second, the tenth, the twentieth, and the thirtieth floors so that each of the water storage tanks 1 may receive and store used water from at least ten floors of the building.

The power generation unit 2 is installed at the lowest floor of the high building 3. The pipes 11 that connect between the water storage tanks 1 have a lower opening that is set above the power generation unit 2. The power generation unit 2 comprises a chassis 21 and an accommodation chamber 22 is mounted on the chassis 21. A top tank 23 is arranged above the accommodation chamber 22. The top tank 23 has a water discharge opening 231. The accommodation chamber 22 receives a first rotary mechanism 24 and a second rotary mechanism 25 mounted therein. A slope water guide channel 26 is arranged above the second rotary mechanism 25. The first rotary mechanism 24 and the second rotary mechanism 25 are respectively coupled to power generation elements 27, 28.

With the above-described arrangement, a high building power generation device is provided. Each of the water storage tanks 1 may receive and store used water from multiple floors and when the storage of water in the tank is full, the control valve 12 can be opened in order to release the stored used water in such a way that the used water flows downward along the pipes 11 to reach the power generation unit 2 and thus impact the first rotary mechanism 24 and the second rotary mechanism 25, causing the first rotary mechanism 24 and the second rotary mechanism 25 to rotate in predetermined directions, thereby driving the power generation elements 27, 28 to generate electrical power.

Figure 3:
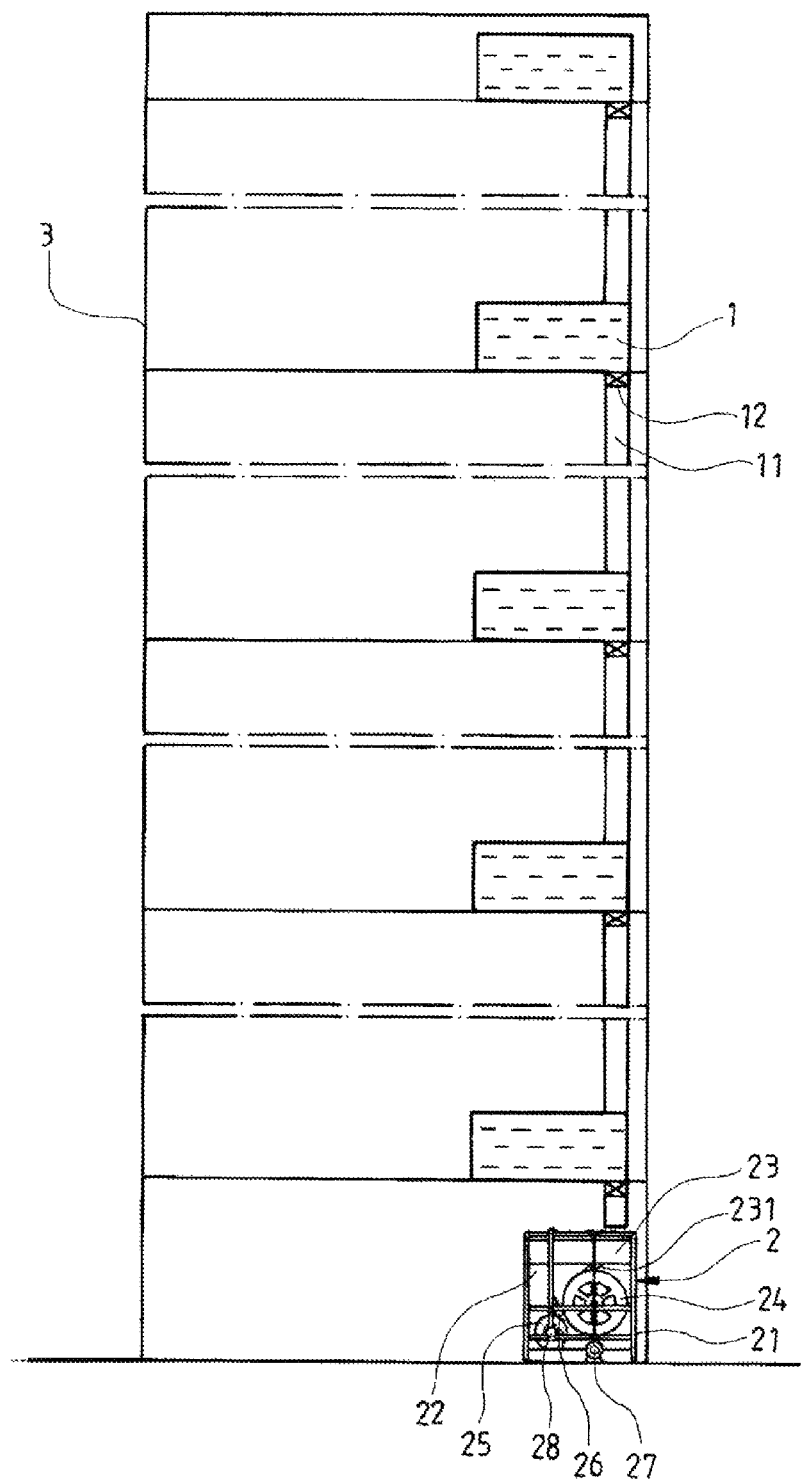
FIG. 3 is a schematic view illustrating a water-stored condition of the present invention.

Referring to FIG. 3, which is a schematic view illustrating a water-stored condition of the present invention, as shown in the drawing, the present invention provides multiple water storage tanks 1 that are arranged to be spaced from each other by predetermined distances by being installed at specific floors of the high building 3 to provide a predetermined vertical distance between adjacent ones of the water storage tanks 1. In a normal condition, the control valve 12 of each of the water storage tanks 1 is kept at a closed condition so that the used water from each of the floors is accumulated and stored in the water storage tanks 1.

Figure 4:
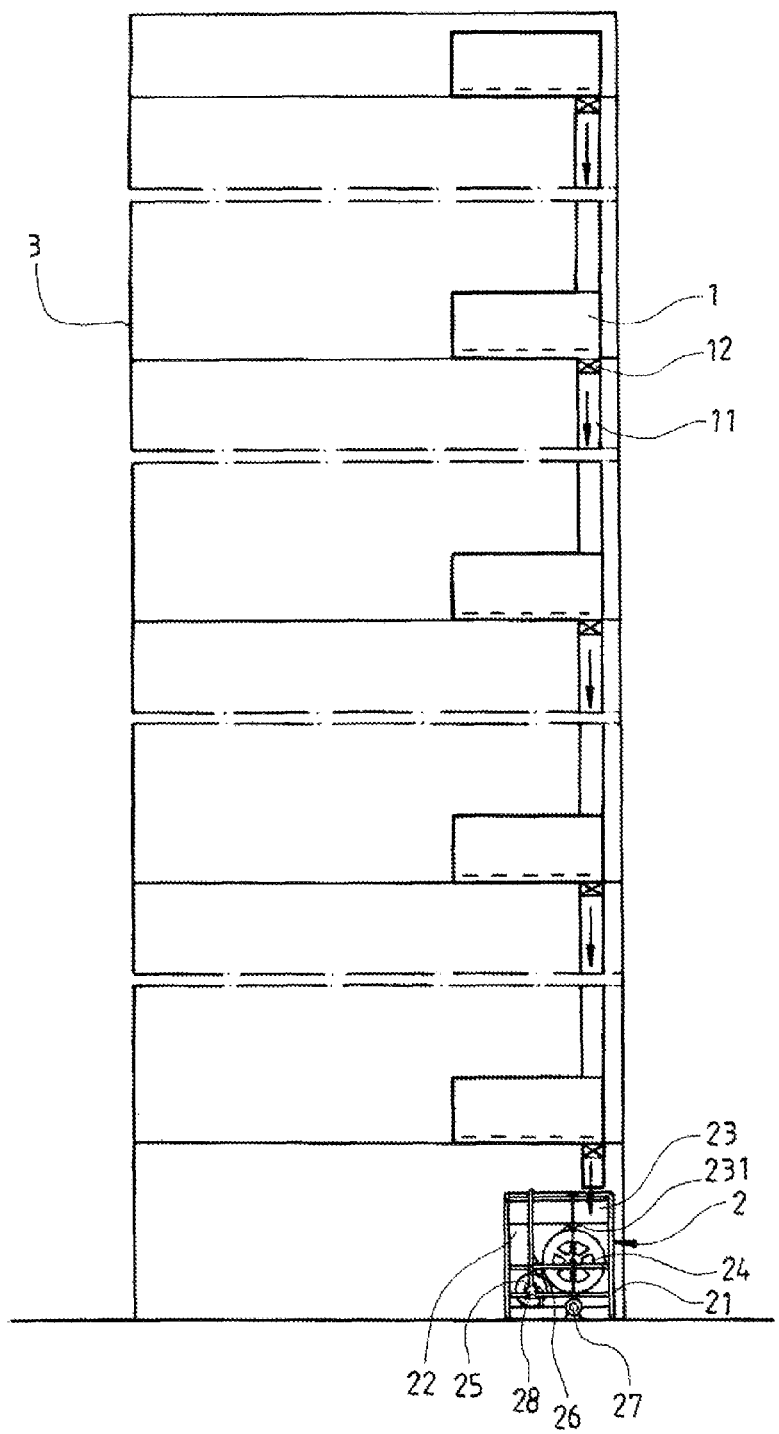
FIG. 4 is a schematic view illustrating a water-released condition of the present invention.

Referring to FIG. 4, which is a schematic view illustrating a water-released condition of the present invention, as shown in the drawing, when one or all of the water storage tanks 1 of the present invention is full, the control valves 12 of the one or all the water storage tanks 1 are opened. Due to full storage of water in the water storage tanks 1, the water is released to flow downward along the pipes 11 so as to reach the power generation unit 2 that is arranged at the lowest floor and under the lower opening of the pipes 11 to thereby impact the first rotary mechanism 24 and the second rotary mechanism 25, causing the first rotary mechanism 24 and the second rotary mechanism 25 to rotate in predetermined directions, thereby driving the power generation elements 27, 28 to generate electrical power.

Figure 5:
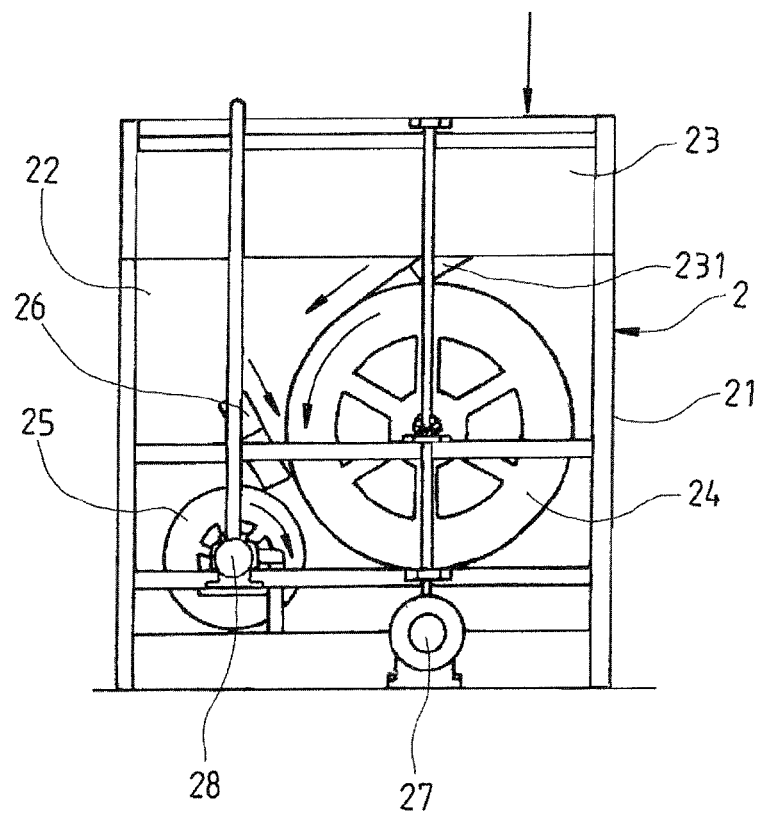
FIG. 5 is a schematic view illustrating a power generation operation of the present invention.

Referring to FIG. 5, a schematic view is given to illustrate a power generation operation of the present invention. Reference is also made to FIG. 4, and as shown in the drawings, when the water storage tanks 1 are full of water, the water is allowed to flow downward along the pipes 11 to fill into the top tank 23. The water is then flows through the water discharge opening 231 of the top tank 23 in a downward direction to reach the first rotary mechanism 24 and thus cause the first rotary mechanism 24 to rotate in a predetermined direction and drive the power generation element 27 to generate electrical power. During the rotation of the first rotary mechanism 2, water may flow into the water guide channel 26 to flush toward the second rotary mechanism 25 to drive the power generation element 28 to generate electrical power. The electrical power generated by the power generation elements 27, 28 may be accumulated and stored for subsequently powering various sorts of electrical appliances. As such, the waste or used water generated in each floor of the high building 3 may be re-used to achieve a purpose of regeneration of resources and saving of energy.

The example described above is only a preferred way of embodying the present invention and is not provided for constraining the scope of the present invention. Minor variations and modifications, which do not depart from the essence of the present invention, are considered within the scope of the present invention as defined in the appended claims.

In summary, the present invention provides a high building power generation device that comprises a plurality of water storage tanks that is arranged at specific floors of a high building to operate in combination with a power generation unit installed in the bottom floor of the high building and to accumulate and store used water from multiple floors of the building so that subsequent use of the waste water to impact and drive a power generation unit may be available for generation of electrical power and a purpose of re-use of used water and saving of energy is achieved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A high building power generation device, comprising:
  a plurality of water storage tanks, which is adapted to be arranged at specific floors of a high building in a manner of being spaced from each other so that a predetermined vertical distance is provided between adjacent ones of the water storage tanks, the water storage tanks being connected to each other with pipes to allow each of the water storage tanks to receive and store used water from multiple floors of the building; and
  a power generation unit, which is arranged at a bottom floor of the high building, the pipe connecting with the water storage tanks having a lower opening that is located above the power generation unit;
  wherein the used water of the multiple floors stored in each of the water storage tanks is allowed to release in such a way that the used water flows downward along the pipes to impact the power generation unit to generate electrical power;

wherein the power generation unit comprises a chassis, an accommodation chamber being formed on the chassis, the accommodation chamber comprising a top tank, the top tank having a water discharge opening, the accommodation chamber comprising a first rotary mechanism and a second rotary mechanism mounted therein, a slope water guide channel being arranged above the second rotary mechanism, the first rotary mechanism and the second rotary mechanism being respectively coupled to power generation elements, whereby the used water that flows down impacts the first rotary mechanism and the second rotary mechanism to cause the first rotary mechanism and the second rotary mechanism to rotate in predetermined direction and thus drive the power generation elements to generate electrical power.

2. The high building power generation device according to claim 1, wherein each of the water storage tanks comprises a control valve mounted at a connection thereof with the pipes to control the water storage tank to store or release water.

\* \* \* \* \*